US008424568B2

(12) United States Patent
Lang et al.

(10) Patent No.: US 8,424,568 B2
(45) Date of Patent: Apr. 23, 2013

(54) CONTROL DEVICE FOR PLUMBING APPLIANCES

(75) Inventors: Edo Lang, Chur (CH); Roland Obrist, Scharans (CH)

(73) Assignee: Oblamatik AG, Chur (CH)

( * ) Notice: Subject to any disclaimer, the term of this patent is extended or adjusted under 35 U.S.C. 154(b) by 471 days.

(21) Appl. No.: 12/918,471

(22) PCT Filed: Jan. 28, 2009

(86) PCT No.: PCT/EP2009/050905

§ 371 (c)(1), (2), (4) Date: Sep. 2, 2010

(87) PCT Pub. No.: WO2009/103596

PCT Pub. Date: Aug. 27, 2009

(65) Prior Publication Data

US 2011/0011473 A1 Jan. 20, 2011

(30) Foreign Application Priority Data

Feb. 20, 2008 (CH) .................................... 0237/08

(51) Int. Cl.
*F16K 21/00* (2006.01)

(52) U.S. Cl.
USPC .................................... 137/605; 251/129.04

(58) Field of Classification Search ................ 137/605; 251/129.04; 200/566
See application file for complete search history.

(56) References Cited

U.S. PATENT DOCUMENTS 5,358,213 A * 10/1994 Pilolla .................... 251/129.03
5,400,820 A * 3/1995 Orth ............................ 137/560
5,577,660 A * 11/1996 Hansen ..................... 236/12.12
7,014,166 B1 * 3/2006 Wang ....................... 251/129.03
7,107,631 B2 9/2006 Lang et al.
8,076,603 B2 * 12/2011 Huang et al. .................. 200/566

FOREIGN PATENT DOCUMENTS

| | | |
|---|---|---|
| DE | 3812736 | 11/1989 |
| DE | 10042722 | 3/2002 |
| DE | 10332708 | 1/2005 |
| EP | 0818587 | 1/1998 |
| EP | 0882848 | 12/1998 |
| EP | 0904469 | 3/1999 |

(Continued)

*Primary Examiner* — John Fox
(74) *Attorney, Agent, or Firm* — Notaro, Michalos & Zaccaria P.C.

(57) ABSTRACT

The application relates to a control device comprising a control element that can be rotated on a first functional level, an electronic controller, an electric power supply, and a base for mounting the control device. Said control device is designed to control plumbing appliances comprising a water discharge point and an electronically controlled mixing valve that has a cold water connection and a hot water connection. The flow or the temperature of the water discharged from the water discharge point can be changed by rotating the control element. The control device according to the invention is characterized in that the control element can be moved onto a second functional level by performing a lifting movement, said second functional level extending parallel to and at a distance from the first functional level. Furthermore, the control device comprises a spring element which elastically retains the control element on the first functional level, the control element being movable onto the second functional level against the resistance of the spring element. The temperature or the flow of the water discharged from the water discharge point can be changed by rotating the control element on the second functional level.

19 Claims, 3 Drawing Sheets

FOREIGN PATENT DOCUMENTS

| | | |
|---|---|---|
| EP | 1120498 | 8/2001 |
| EP | 1601841 | 12/2005 |
| EP | 1609402 | 12/2005 |
| WO | WO 2006/061657 | 6/2006 |

* cited by examiner

CONTROL DEVICE FOR PLUMBING APPLIANCES

The invention relates to a control device comprising a control element that can be rotated on a first functional level, an electronic controller, an electric power supply, and a base for mounting the control device in accordance with the preamble of the independent claim 1. Said control device is designed to control plumbing appliances comprising a water discharge point and an electronically controlled mixing valve that has a cold water connection and a hot water connection. Thereby, the flow of the water discharged from the water discharge point can be changed by rotating the control element.

Electronic controllers for the control of plumbing appliances with a water discharge point are known in accordance with the state of the art. Designated as "plumbing appliances" in connection with this invention are e.g. washbasins, kitchen sinks, showers, bath tubs and the like, as these are used for example in households, public buildings and tourist facilities such as wellness hotels and the like. "Water discharge points" are e.g. fittings, water taps, water outlet valve arrangements, water mixing valves and the like, as these also have been known for a long time. Electronic controllers for the discharge of water on plumbing appliances are known e.g. from the U.S. Pat. No. 7,107,631 B2 or from the patent EP 1 601 841 B1 of the current applicant. These documents disclose a device for contactless control of the discharge of water resp. a method for controlling the inflow of water into a plumbing appliance.

Additional control devices for the control of plumbing appliances with a water discharge point are known in accordance with the state of the art. Control devices of this type can be based on a purely mechanical principle of action (see e.g. a single-lever mixer known from patent application EP 0 818 587 A2 or the long-known so-called "three-hole faucet"). Also the combination of mechanical principles of action with an electronic proximity switch for opening the flow of water when a person approaches a plumbing appliance is known (see e.g. EP 0 904 469 B1, EP 0 882 848 B1 and EP 1 120 498 B1). Furthermore, an optical display of the current water temperature discharged is known in accordance with the state of the art in the form of one or more light emitting diodes in combination with a mechanical single-lever mixer (see DE 100 42 722 A1). However, control devices of this type can also be based on an electronic principle of action, wherein sensor arrays (see e.g. DE 103 32 708 B3), keypads (see DE 38 12 736 C1) or a two-dimensional control surface (see WO 2006/061657 A1) with a touch-sensitive matrix (within the meaning of a "touchpad") or with a proximity-sensitive matrix are used to select a desired flow of water and/or a desired water temperature.

In most cases, the known purely mechanical control devices provide insufficient handling comfort. Thus, the effort needed to open the water taps of a three-hole faucet can be too great for users of very old age and it can be quite difficult to adjust a certain flow of water or a desired temperature. Especially the control of a single-lever mixer that is movable on two different levels can cause demands that are too high for the fine motor functions of the users. Known electronic control devices also have disadvantages; thus, the complexity of a multitude of keypads can demand too much from the user, require too much time for setting the desired flow of water and the desired temperature, and only be difficult to control under bad light conditions in particular. In addition to the mostly complex and costly design of these (see DE 38 12 736 C1 and WO 2006/061657 A1), electronic control devices can also demand capabilities with regard to fine motor functions that are to high for elderly users (see e.g. DE 103 32 708 B3). Another control device is known from the European patent application published under the number EP 1 609 402 A1. To select a certain function (hydraulic functions, such as e.g. overhead or hand shower; additional functions, such as e.g. sauna operation, listening to radio or release of aroma), a control element is moved to a certain angle position. The same control element is or one to two other control elements are used to activate the selected function (e.g. flow of water, water temperature; sauna temperature; choice of station, music volume). If only a single control element is used, then a first functional level is assigned to the selection function, and a second and a third functional level to the activating functions, onto which this control element must be moved.

The objective of this invention is to propose an alternative control device for controlling the flow of the water and the temperature of the water on plumbing appliances comprising an electronically controlled mixing valve as well as a cold water connection and a hot water connection that is easy and virtually effortless to use.

This objective is fulfilled with the features of the independent claim 1 by proposing a control device comprising a control element that can be rotated on a first functional level, an electronic controller, an electric power supply, and a base for mounting the control device, and which is designed to control plumbing appliances comprising a water discharge point and an electronically controlled mixing valve that has a cold water connection and a hot water connection, wherein the flow or the temperature of the water discharged from the water discharge point can be changed by rotating the control element. The control device according to the invention is characterized in that the control element can be moved onto a second functional level by performing a lifting movement, said second functional level extending parallel to and at a distance from the first functional level. Furthermore, the control device comprises a spring element which elastically retains the control element on the first functional level, the control element being movable onto the second functional level against the resistance of the spring element. The temperature or the flow of the water discharged from the water discharge point can be changed by rotating the control element on the second functional level.

Other additional and inventive features result from the dependent claims and the combinations of these.

The advantages of the control device according to the invention comprise:

- The control of a water discharge point comprising an electronically controlled mixing valve that has a cold water connection and a hot water connection and which is equipped with the control device according to the invention is simplified.
- Thanks to the simplicity of the control device, such a water discharge point can be controlled quickly, safely, intuitively and reproducibly.
- The selection is limited to two defined functional levels, of which one is determined elastically by a spring element and the other can only be reached and maintained by a (thus minor) effort.
- The desired parameters on the first and the second level are in any case adjusted independently from the angle or position.
- The effort for cleaning the control device is reduced to a minimum, as this is provided only with simple and easily to be cleaned surfaces.

Thanks to the simple movements, a water discharge point of this type is feasible even with reduced human fine motor functions and moreover virtually effortless to use.

According to a preferred embodiment, the control device can be arranged flexibly and optimally for the current user.

The entire control is performed using a single knob, to which two functional levels can be assigned, whereby the flow of the water can be adjusted on the first level and the temperature of the water discharged from the device on the second level.

The water saving device according to the invention shall now be explained in more detail on the basis of exemplary schematic drawings, which do not limit the scope of this invention. Thereby, the figures show:

FIG. 1 a top view of a kitchen sink comprising a water discharge point and a control device firmly mounted on the faceplate of the kitchen combination;

FIG. 2 a top view of a washbasin comprising a water discharge point and a control device firmly mounted on the washbasin;

FIG. 3 a front view of the kitchen combination shown in FIG. 1 comprising a kitchen sink and a water discharge point as well as a control device firmly mounted on the faceplate of the kitchen combination;

FIG. 4 a partial section through a washbasin comprising a water discharge point and a control device firmly mounted to the wall bearing the washbasin;

FIG. 5 views of different embodiments of the control device according to the invention comprising a switching element, which can perform a lifting movement from the first onto the second functional level and at the same time is the control element that can be rotated, wherein:

Figure 6:
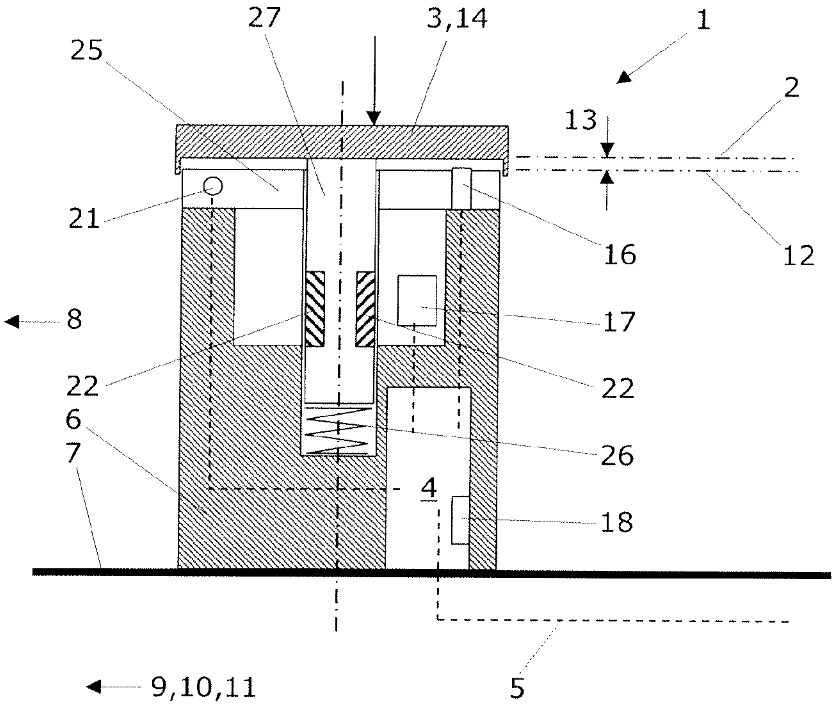
Figure 7:
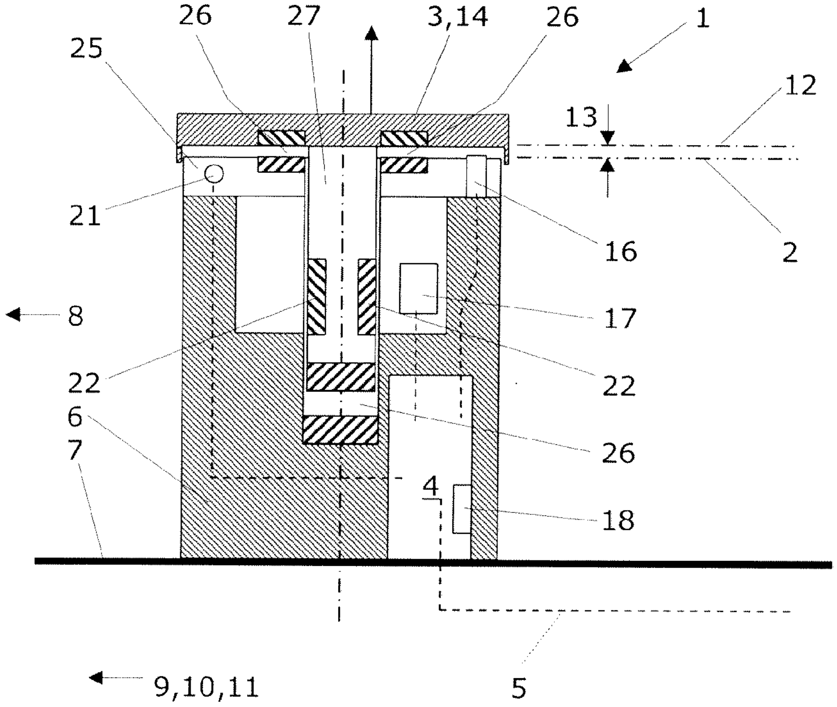
Figures 8A, 8B:
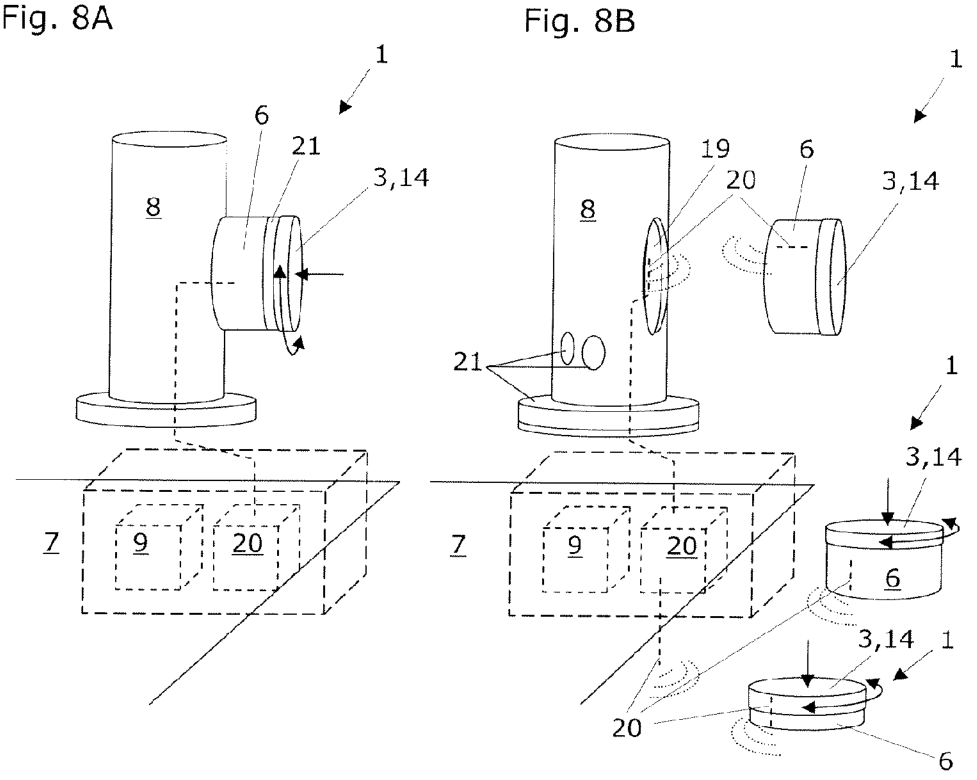
Figure 9:
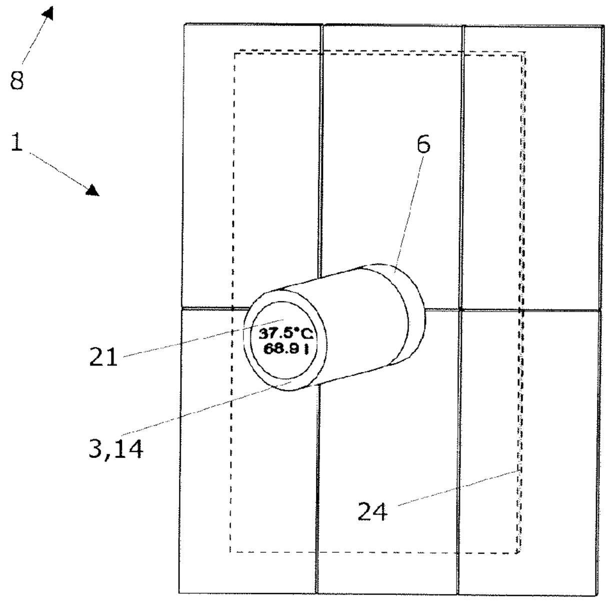

FIG. 6 a part section through a control device according to the first embodiment comprising a spring element in the form of a coil spring;

FIG. 7 a part section through a control device according to the first embodiment comprising a spring element in the form of a pair of magnets;

FIG. 8 views of a water discharge point of a kitchen sink and a relevant control device, wherein:

FIG. 8A shows a view of a control device according to the first embodiment, which is mounted to the water discharge point;

FIG. 8B shows a view of a control device according to a sixth and seventh embodiment that can be mounted to the water discharge point and which can be removed from there and positioned practically at random;

FIG. 9 a control device for the water discharge point of a shower, which can be positioned practically at random on a wall thanks to a magnetizable plate under a glass or ceramic plate.

Figure 1:
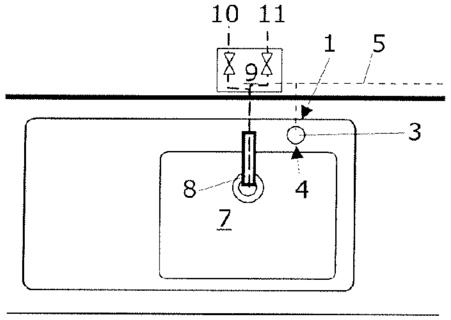

FIG. 1 shows a top view of a kitchen sink 7 comprising a water discharge point 8 and a control device 1 firmly mounted on the faceplate of the kitchen combination. Said control device 1 comprises a control element 3 that can be rotated on a first functional level 2. The control element is preferably designed as rotating part, as this is known as water tap on conventional fittings or also as revolving unit on monobloc mixers of electronically controlled fittings (see e.g. EP 1 120 498 B1). The flow and/or the temperature of the water discharged from the water discharge point 8 can be changed by rotating this control element 3.

The control device 1 furthermore comprises an electronic controller 4, an electric power supply 5, and a base 6 for mounting the control device 1. Thereby, the electronic controller 4 can be installed in the control device 1 or its base 6 as a separate electronic component, such as e.g. a populated circuit. But the electronic controller 4 of the control device 1 can also form part of the electronic controller of the fitting or the water discharge point 8 or the mixing valve 9 as an electronic component, such as a populated circuit or a microchip.

Said control device 1 is designed to control plumbing appliances 7 comprising a water discharge point 8 and an electronically controlled mixing valve 9 that has a cold water connection 10 and a hot water connection 11. As mentioned above, the term plumbing appliances 7 in connection with this invention relates to e.g. washbasins, kitchen sinks, showers, bath tubs and the like.

In accordance with the invention, the control element 3 can be moved onto a second functional level 12 by performing a lifting movement, said second functional level extending parallel to and at a distance 13 from the first functional level 2 (see e.g. FIG. 6). Furthermore, the control device 1 comprises a spring element 26 which elastically retains the control element 3 on the first functional level 2, the control element 3 being movable onto the second functional level 12 against the resistance of the spring element. The temperature or the flow of the water discharged from the water discharge point 7 can be changed by rotating the control element 3 on the second functional level 12.

Figure 2:
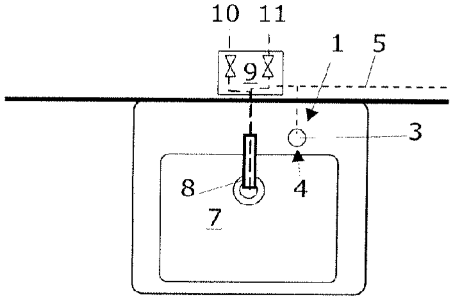

FIG. 2 shows a top view of a washbasin 7 comprising a water discharge point 8 and a control device 1 firmly mounted on the washbasin. As in FIG. 1, a possible position of the electronic controller 4 of the control device 1 is indicated by a dashed arrow.

Figure 3:
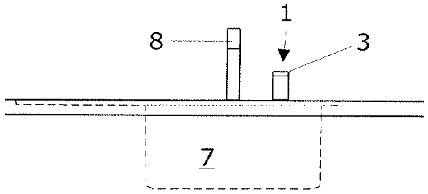

FIG. 3 shows the front view of the kitchen combination shown in FIG. 1 comprising a kitchen sink 7 and a water discharge point 8 as well as a control device 1 firmly mounted on the faceplate of the kitchen combination.

Figure 4:
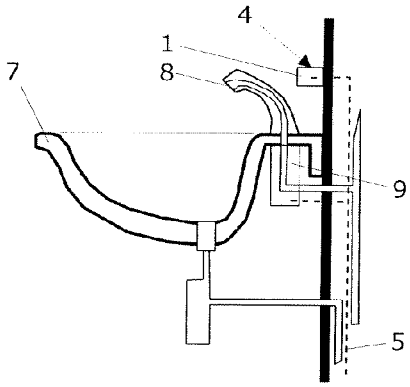

FIG. 4 shows a partial section through a washbasin 7 comprising a water discharge point 8 and a control device 1 firmly mounted to the wall bearing the washbasin 7. In contrast to the previous figures, in which a control device 1 sitting on the plumbing appliance 7 is shown, this control device 1 here is mounted to the wall bearing the washbasin 7, independently from the mounting of said washbasin.

FIG. 5 shows views of different embodiments of the control device according to the invention.

Figure 5A:
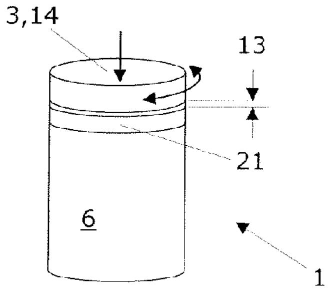
FIG. 5A shows a first embodiment comprising a narrow control element and a visible base that has an optical display device placed on top.

FIG. 5A shows a first embodiment of the control device 1 according to the invention comprising a narrow control element 3 and a visible base 6 that has an optical display device 21 placed on top. The control element 3 can perform a mechanical lifting movement from the first functional level 2 onto the second functional level 12. Said second functional level 12 extends parallel to and at a distance 13 from the first functional level 2 (see also FIG. 6). The direction of said lifting movement is thereby preferably linear and perpendicular to the two functional levels 2, 12. The lifting movement can be designated as a simple movement to or down. This lifting movement is thus performed preferably linear and in the direction of the axis of rotation 27; alternatively, it can be performed in any other direction and moreover deviate from a linear movement (not shown).

Also visible in FIG. 5A is an optical display device 21, which preferably rests on the base 6, as shown. This optical display device 21 is designed to display current settings of the control device 1 or the mixing valve 9. The optical display device 21 preferably comprises an RGB LED, as it is known in accordance with the state of the art.

Said RGB LED 21 is connected with the electronic controller 4 of the control device 1 and shows e.g. the flow of cold water from the fitting 8 or the relevant aperture position of the electronically controlled mixing valve 9 for the cold water connection 10 in blue color (see FIGS. 1 and 2).

Said RGB LED 21 is connected with the electronic controller 4 of the control device 1 and shows e.g. the flow of hot water from the fitting 8 or the relevant aperture position of the electronically controlled mixing valve 9 for the cold water and the hot water connection 10, 11 in orange color (see FIGS. 1 and 2). Thereby, the orange light of the RGB LED preferably intensifies at an increasing flow.

Said RGB LED 21 is connected with the electronic controller 4 of the control device 1 and shows e.g. the flow of hot water from the fitting 8 or the relevant aperture position of the electronically controlled mixing valve 9 for the hot water connection 11 in red color (see FIGS. 1 and 2).

Particularly preferred is an RGB LED 21 that is at least partially inserted or cast into an acrylic glass ring 25, which makes the relevant light visible all around, i.e. from all sides.

Figure 5B:
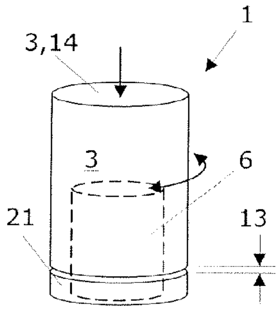
FIG. 5B shows a second embodiment comprising a wide control element and an invisible base that has an optical display device placed on top.

FIG. 5B shows a second embodiment comprising a wide control element 3 and an invisible base 6 that has an optical display device 21 placed on top. The control element 3 is at the same time designed as rotating element and can perform a lifting movement from the first functional level 2 onto the second functional level 12. In this case, the control element 3 is designed as a shell that can be rotated and which is pulled down over the base 6 of the control device 1. The optical display device 21 is separated mechanically from the control element 3 or switching element 14 in this case and does not rotate with the control element 3 designed as rotating part. This optical display device 21 is designed to display current settings of the control device 1 or the mixing valve 9. The optical display device 21 preferably comprises an RGB LED, as it is generally known in accordance with the state of the art and has been described already in connection with FIG. 5A.

Figure 5C:
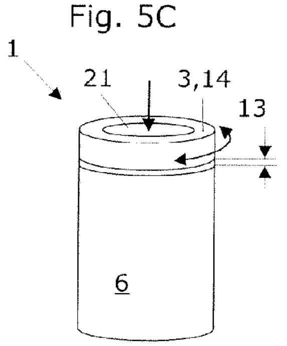
FIG. 5C shows a third embodiment comprising a narrow control element that has an inserted optical display device and a visible base.

FIG. 5C shows a third embodiment comprising a narrow control element 3 that has an inserted optical display device 21 and a visible base 6. The control element 3 or switching element 14 is at the same time designed as rotating element and can perform a lifting movement from the first functional level 2 onto the second functional level 12, as this has been described already in FIG. 5A. However, in this case the optical display device 21 is integrated in the switching element 14 and rotates with the control element 3 designed as rotating part. This optical display device 21 is designed to display current settings of the control device 1 or the mixing valve 9. The optical display device 21 preferably comprises an RGB LED, as it is generally known in accordance with the state of the art and has been described already in connection with FIG. 5A. In this design example, the optical display device 21 is particularly preferred as numerical display (with or without illumination), as this is also shown in FIG. 9.

Figure 5D:
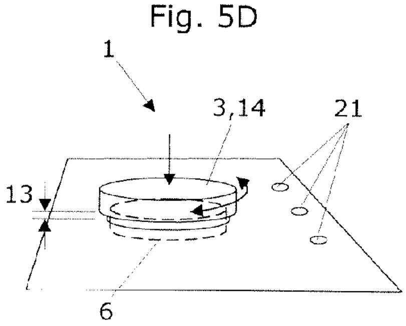
FIG. 5D shows a fourth embodiment comprising a narrow control element and an invisible base, wherein the optical display device is arranged at a distance.

FIG. 5D shows a fourth embodiment comprising a narrow control element 3 and an invisible base 6, wherein the optical display device 21 is arranged at a distance. The control element 3 is at the same time designed as rotating element and can perform a lifting movement from the first functional level 2 onto the second functional level 12. In this case, the control element 3 is designed as a shell that can be rotated and which is pulled down at least partially over the base 6 of the control device 1. The base is either very thin in this case or alternatively inserted partially in a surface bearing this base 6, so that only the control element 3 is visible, which maintains at least a distance 13 to this surface. In this case, the optical display device 21 is separated mechanically and spatially from the control element 3 or switching element 14 and inserted in the surface bearing the control element 1. Said surface can be designed as ceramic plate, glass plate or also as faceplate of a kitchen combination. Alternatively to these options for positioning an optical display device 21 at a distance from the control element 1, it can also be provided that the display device 21 is installed in a standing column of a sanitary appliance 8 (see FIG. 8B). This optical display device 21 is designed to display current settings of the control device 1 or the mixing valve 9. The optical display device 21 preferably comprises an RGB LED, as it is generally known in accordance with the state of the art and has been described already in connection with FIG. 5A (not shown here). Alternatively to that, this optical display device 21 comprises a number (e.g. two or three) color LEDs, by which the current settings of the control device 1 or the mixing valve 9 can also be shown.

It applies for all embodiments of the control device 1 shown that the temperature of the water discharged from the water discharge point 7 can be changed by rotating the control element 3 when the second functional level 12 has been assigned. Naturally, the assignment of the first and the second functional level to the change in the flow or the temperature of the water discharged from the fitting 8 can be exchanged at random. It is thus of an advantage, for example, if the control device 1 of a shower fitting 8 is designed in such a way that the temperature of the water is changed when the control element 3 is turned on the first functional level 2. In the case of a kitchen fitting 8, on the other hand, the first functional level 2 is preferably assigned to changing the flow of the water.

FIG. 6 shows a partial section through a control device 1 according to the first embodiment. The control device 1 comprises a first sensor 16 for mechanical, optical, capacitive or inductive detection of the lifting movement of the switching element 14 or control element 3. In this case, the first sensor 15 is designed as a capacitive proximity switch that assigns the second functional level 12 to the control element 3 when the control element 3 is approximated. Moreover, said control device 1 comprises a second sensor 17 for mechanical, optical, capacitive or inductive detection of the rotating movement of the control element 3. In this case, said second sensor 17 is designed as firmly mounted Hall sensor that detects the rotary position of the control element 3 in relation to permanent magnets 22 firmly mounted in the co-rotating axis 27 of the control element 3 when said control element is rotated. This information is transmitted to the electronic controller 4 of the control device 1, so that the same can cause the electronic valve control 9 of the fitting 8 to change the aperture of the valves for the cold water and/or the hot water connection accordingly. The switching element 14, which in this case is at the same time designed as control element 3, is preferably retained elastically at a distance from the acrylic glass ring 25 of the optical display device 21 and the base 6 by means of a spring 26. As a result, the control device 1 according to the invention comprises a spring element 26 which elastically retains the control element 3 on the first functional level 2, the control element 3 being movable onto the second functional level 12 against the resistance of the spring element.

The electronic controller 4 of said control device 1 is thus designed that it can be activated to open the electronically controlled mixing valve 9, whereby said activation of the electronic controller 4 can be effected by means of a lifting movement of the switching element 14 or control element 3 by an operating person.

Particularly preferred for the use in a control device 1 according to the invention is a generally known rotary switch with a mechanical incremental encoder, which is commercially available with or without push-button function. Extremely compact rotary encoders of this type are extremely resistant against defects and combine robustness and durability with an excellent locking feeling. The selectable locking moment and the equally selectable touching force result in a safe turning feeling for the user and a clear assignment of the different functional levels. Rotary switches of this type are waterproof and can be installed or operated both in a horizontal as well as a vertical position.

FIG. 7 shows a part section through a control device 1 according to the first embodiment comprising an alternative spring element 26 in the form of a pair of magnets. In this case, a pair of equally oriented magnets is shown at the base of the rotation axis 27, which pulls the control element 3 against the base 6. Moreover, two ring magnets oriented in opposite directions to each other (and therefore repelling each other) are arranged here as an example at the opposite outer surfaces of the control element 3 and the acrylic glass ring 25. Additional spring elements can be selected from a group of elements consisting of at least a coil spring, at least a pair of magnets and at least a piezoelement as well as a random number of combinations of these elements.

According to a first variant, the spring element 26 is thereby principally arranged and designed in such a way between the base 6 and the control element 3 that the resistance of the spring element reacts to a pressure against the control element 3 for movement of the same onto the second functional level 12 (see FIG. 6). According to a second variant, the spring element 26 is arranged and designed in such a way between the base 6 and the control element 3 that the resistance of the spring element reacts to a tensile force against the control element 3 for movement of the same onto the second functional level 12 (see FIG. 7). By selecting the strength of the magnets or the springs of a combination of such elements, it is determined by an expert whether the spring element 26 shall react to a tensile force or a compressive force in the direction of the axis 27. If the suitable means are selected, it is also possible to reach a second functional level 12 by tensile or compressive force starting from the first functional level 2 and moreover an additional third functional level by a relevant inverse force starting from the first functional level 2 (not shown). However, it always applies that the control element 3 jumps back onto the first functional level 2 elastically when it is released.

Three cases for the selection of an average flow of water with a pre-selected temperature are particularly preferred:

A The electronic controller 4 of the control device 1 is preferably designed in such a way that it triggers the electronically controlled mixing valve 9 to release an average flow of cold water from the water discharge point 8 by single performance of a lifting movement of the switching element 14 or control element 3. In this case, the cold water temperature is preferably 10° C.

B Moreover, it is preferred that the electronic controller 4 of the control device 1 is designed in such a way that it triggers the electronically controlled mixing valve 9 to release an average flow of warm water from the water discharge point 8 by two-fold performance of a lifting movement of the switching element 14 or control element 3. In this case, the hot water temperature is preferably 35° C.

C Furthermore, it is preferred that the electronic controller 4 of the control device 1 is designed in such a way that it triggers the electronically controlled mixing valve 9 to release an average flow of hot water from the water discharge point 8 by three-fold performance of a lifting movement of the switching element 14 or control element 3. In this case, the hot water temperature is preferably 60° C.

In all three cases A-C, a single, additional performance of a lifting movement of the switching element 14 or control element 3 to/fro or down/up or up/down results in the closure of the electronically controlled mixing valve 9 and thus to an interruption of the withdrawal of water. A two-way lifting movement of this type, which is used in accordance with the invention to select an average flow of water with a pre-selected temperature, but also to close the electronically controlled mixing valve 9, can be performed very briefly and requires typically and preferably less than 1 second to be performed.

The electronic controller 4 of the control device 1 preferably comprises a memory mode. Directly after selecting an average flow of water with a pre-selected temperature in accordance with one of the cases A-C, a change of the temperature is detected in this mode by rotating the control element 3 and at the same time staying on the second level 12 with the switching element 14 or control element 3 for an activation period. Said activation period is preferably 5 seconds, but can be adapted as needed. After activation, the changed temperature values are stored, so that the electronic controller releases water using the newly stored values the next time an average flow of water with a pre-selected temperature is selected in accordance with the cases A-C.

Preferably, all current settings of the fitting can be stored by means of staying on the second functional level 12 with the switching element 14 or control element 3 at the same time during an activation period. Accordingly, the electronic controller 4 of the control device 1 preferably comprises at least 3 storages S1, S2 and S3, to which any flow/temperature combination can be assigned each, depending on current desire (see comments ad FIG. 5). The associated lifting movement can be designated as simple movement to, fro, up or down.

Preferably, the control device 1 comprises an acoustic sounder 18 (see FIGS. 7 and 8) that is designed to confirm every lifting movement of the switching element 14 or control element 3 by giving off an acoustic signal.

FIG. 8 shows views of a water discharge point 8 of a kitchen sink 7 and a relevant control device 1. FIG. 8A thereby shows a view of a control device 1 according to the first embodiment that is mounted to the water discharge point 8 with the base 6. In this case, the control device 1 is integrated in a water discharge point 8. According to the alignment of the control device 1, the switching element 14 is now pressed or touched from the side to assign a second functional level 12 to the control element 3. In this case, the control device 1 comprises a transmission device 20 that is designed to transmit control commands from the control element 3 to the electronic controller 4, whereby said transmission device 20 is designed wire-bound.

An optical display device 21 is preferably affixed to the base 6 in this case and does not rotate with the control element 3 designed as rotating part. This optical display device 21 is designed to display current settings of the control device 1 or the mixing valve 9. The optical display device 21 preferably comprises an RGB LED, as it is generally known in accordance with the state of the art and has been described already in connection with FIG. 5A.

FIG. 8B shows a view of a control device 1 according to a sixth and seventh embodiment that can be mounted to the water discharge point 8 and which can be removed from there and positioned practically at random. Thus, said control device 1 is designed to be able to be positioned separately from the water discharge point 8. Said control device 1 preferably comprises a transmission device 20 that is designed to transmit control commands from the control element 3 to the electronic controller 4, whereby said transmission device 20 is designed wireless.

Especially preferred is a control device 1 of this type in which the transmission device 20 is moreover designed for wireless transmission of electric power to the control element 3. Said transmission is preferably performed using high-frequency radio waves.

An optical display device 21 is preferably arranged at the foot of the fitting 8 in this case and thus cannot be removed with the control element 3 designed as rotating part. This is for the reason that the power transmission is generally not enough to supply a display device 21 arranged on the control element 3. This optical display device 21 is designed to display current settings of the control device 1 or the mixing valve 9. The optical display device 21 preferably comprises an RGB LED, as it is generally known in accordance with the state of the art and has been described already in connection with FIG. 5A. Alternatively or in addition to such an optical display device 21 with an RGB LED, one or more color LEDs (two are shown) can be arranged at the standing column of the fitting 8.

To dock the removable control device 1 to the fitting 8, the water discharge point 8 is preferably provided with a special surface 19 in the form of a loading bay. The power can be transmitted to said control device 1 by means of induction or also by means of electric contacts when the control device 1 is docked. Magnetic forces are preferably used for secure fixture of the control device 1 to the fitting 8. Thereby, it is left up to an expert to determine which of the two functional partners comprises a permanent magnet and which one a reversely polarized permanent magnet or just a magnetizable metal plate. In principal, the use of solenoids is also possible.

FIG. 9 shows a control device 1 for the water discharge point 8 of a shower 7, which can be positioned practically at random on a wall thanks to a magnetizable plate under a glass or ceramic plate. The transmission of data and power is also performed wirelessly in the case of this sixth and seventh embodiment of the control device 1, which substantially vary by the height of the base 6, as in FIG. 8. In this example, the current temperature (37.5° C.) and the current water consumption (68.9 l/min) are indicated by means of numerical values. Naturally, the controller of the control device 1 requires relevant data, which is provided to the controller by generally known and respectively arranged sensors, such as PT100 sensors or flowmeters. A permanent magnet in the base 6 ensures that the control device 1 remains in its allocated place and does not fall down. Friction-raising coatings at the underside of the base 6 (not shown) preferably increase the operational safety and the stability of said control device 1.

The scope of this invention includes a random number of combinations of the features described and shown in the figures. The drawing references in the figures refer to the same features, even if these are not described in detail in every case.

DRAWING REFERENCES

1 Control device
2 First functional level
3 Control element
4 Electronic controller
5 Electric power supply
6 Base
7 Plumbing appliance
8 Water discharge point, fitting
9 Electronically controlled mixing valve
10 Cold water connection
11 Hot water connection
12 Second functional level
13 Distance
14 Switching element
16 First sensor
17 Second sensor
18 Acoustic sounder
19 Fitting surface
20 Transmission device
21 Optical display device, RGB LED, color LEDs
22 Magnet
23 Guide
24 Magnetizable plate
25 Acrylic glass ring
26 Spring element
27 Axis
28 Surface

The invention claimed is:

1. Sanitary appliance comprising:

a water discharge point (8);

an electronically controlled mixing valve (9) that has a cold water connection (10) and a hot water connection (11), a control device (1) to control the water discharge point (8) with:

a) a control element (3) that can be rotated on a first functional level (2) and on a second functional level (12), said second functional level (12) extending parallel to and at a distance (13) from the first functional level (2), b) an electronic controller (4), c) an electric power supply (5), d) a base (6) for mounting the control device (1), and e) a spring element (26) which elastically retains the control element (3) on the first functional level (2), the control element (3) being movable onto the second functional level (12) by performing a lifting movement against the resistance of the spring element (3), whereby the control element (3) jumps back onto the first functional level (2) elastically when it is released, characterized in that the flow or the temperature of the water discharged from the water discharge point (8) can be changed by rotating the control element (3) on the first functional level (2), and that the temperature or the flow of the water discharged from the water discharge point (8) can be changed by rotating the control element (3) on the second functional level (12), whereby the desired temperature and flow parameters are set independently from a specific angle or from a specific position by means of said rotating movements.

2. Sanitary appliance according to claim 1, characterized in that said lifting movement is linear and can be performed in one direction of movement that is perpendicular to the two functional levels (2, 12).

3. Sanitary appliance according to claim 1, characterized in that the spring element (26) is arranged and designed in such a way between the base (6) and the control element (3) that the resistance of the spring element reacts to a pressure against the control element (3) for movement of the same onto the second functional level (12).

4. Sanitary appliance according to claim 1, characterized in that the spring element (26) is arranged and designed in such a way between the base (6) and the control element (3) that the resistance of the spring element reacts to a tensile force against the control element (3) for movement of the same onto the second functional level (12).

5. Sanitary appliance according to claim 1, characterized in that at least one spring element (26) is selected from a group consisting of at least a coil spring, at least a pair of magnets and at least a piezoelement as well as a random number of combinations of these elements.

6. Sanitary appliance according to claim 1, characterized in that it comprises a first sensor (16) and a second sensor (17) for mechanical, optical, capacitive or inductive detection of the lifting movement and/or the rotating movement of the control element (3).

7. Sanitary appliance according to claim 1, characterized in that it comprises an optical display device (21) that is designed to display current settings of the control device (1) or the mixing valve (9).

8. Sanitary appliance according to claim 7, characterized in that the optical display device (21) comprises an RGB LED or multiple color LEDs that indicate the flow of cold and/or warm and/or hot water in different colors.

9. Sanitary appliance according to claim 7, characterized in that the optical display device (21) comprises an RGB LED that is at least partially inserted into an acrylic glass ring (25) arranged on the control device (1) or cast into said acrylic glass ring (25).

10. Sanitary appliance according to claim 7, characterized in that the optical display device (21) comprises an RGB LED and/or multiple color LEDs that are arranged at a distance to the control device (1).

11. Sanitary appliance according to claim 1, characterized in that the electronic controller (4) is designed that it can be activated to open the electronically controlled mixing valve (9), whereby said activation of the electronic controller (4) can be effected by means of at least a lifting movement of the control element (3) by an operating person.

12. Sanitary appliance according to claim 11, characterized in that the electronic controller (4) is designed in such a way that it triggers the electronically controlled mixing valve (9) to release an average flow of cold water from the water discharge point (8) by single performance of a lifting movement of the control element (3).

13. Sanitary appliance according to claim 11, characterized in that the electronic controller (4) is designed in such a way that it triggers the electronically controlled mixing valve (9) to release an average flow of warm water from the water discharge point (8) by two-fold performance of a lifting movement of the control element (3).

14. Sanitary appliance according to claim 11, characterized in that the electronic controller (4) is designed in such a way that it triggers the electronically controlled mixing valve (9) to release an average flow of hot water from the water discharge point (8) by three-fold performance of a lifting movement of the control element (3).

15. Sanitary appliance according to claim 12, characterized in that the electronic controller (4) comprises a memory mode that can be activated by staying on the second level (12) with the control element (3) for an activation period, so that changed values are stored and activated at the next withdrawal of water.

16. Sanitary appliance according to claim 1, characterized in that it comprises an acoustic sounder (18) that is designed to confirm every lifting movement of the control element (3) by giving off an acoustic signal.

17. Sanitary appliance according to claim 1, characterized in that it is designed integrated in a water discharge point (8), able to be positioned on the surface (19) of a water discharge point (8), or separately from said water discharge point (8).

18. Sanitary appliance according to claim 1, characterized in that it comprises a transmission device (20) that is designed to transmit control commands from the control element (3) to the electronic controller (4), whereby said transmission device (20) is designed wire-bound or wireless.

19. Sanitary appliance according to claim 18, characterized in that the transmission device (20) is moreover designed for wireless transmission of electric power to the control element (3).

* * * * *